United States Patent [19]

Jones

[11] 4,325,660
[45] Apr. 20, 1982

[54] SINGLE LINE PRESSURE-PRESSURE PNEUMATIC TUBE SYSTEM

[75] Inventor: William W. Jones, Houston, Tex.

[73] Assignee: C. K. Kelley and Sons, Inc., Houston, Tex.

[21] Appl. No.: 124,897

[22] Filed: Feb. 26, 1980

[51] Int. Cl.³ ............................................. B65G 51/08
[52] U.S. Cl. ..................................... 406/84; 137/112;
137/521; 406/112; 406/192
[58] Field of Search .................... 406/83, 84, 110, 111, 406/112, 147, 176, 192; 137/112, 521

[56] References Cited

U.S. PATENT DOCUMENTS 3,778,006 12/1973 Martin .................................. 406/112
4,189,261 2/1980 Kelley et al. ........................ 406/112

FOREIGN PATENT DOCUMENTS 518435 7/1976 U.S.S.R. .............................. 406/192

Primary Examiner—Jeffrey V. Nase
Attorney, Agent, or Firm—James C. Wray

[57] ABSTRACT

A single line, pressure-pressure, pneumatic tube system having a pair of terminals each being capable of dispatching or receiving carriers. Each terminal provided with a blower to provide air flow, tubing connecting the two terminals, a pair of inline valves in the tubing, one facing in one direction and the other in the opposite direction. The valves being so designed that the one near the dispatching terminal automatically closes to permit build up of pressure and the one near the receiving terminal opens to exhaust pressure and slow the travel of the carrier as it approaches the receiving terminal, the terminal having a bleed-off orifice to assure carrier arrival.

4 Claims, 4 Drawing Figures

SINGLE LINE PRESSURE-PRESSURE PNEUMATIC TUBE SYSTEM

DESCRIPTION

1. Technical Field

This invention relates to an improved single line, pressure-pressure, pneumatic tube system having automatic means controlling the speed of the carrier.

2. Background Art

One of the difficulties of single line, pneumatic tube systems has been the speed of the carrier at the receiving terminal, particularly during pressure operation. U.S. Pat. No. 4,189,261 discloses an improved single line, pressure-vacuum pneumatic tube system with a relief valve remote from the end terminal that during pressure operation discharges the air pressure, whereby the end travel of the carrier is slowed. U.S. Pat. No. 2,698,721 discloses a similar system. However, these two systems while single line, operate on pressure in one direction and vacuum in the other. While there are several single line pneumatic tube systems available in the United States which operate on pressure in both directions, as far as is known, none of the systems satisfactorily control the speed of the carrier at the receiving terminal. Hence the carrier arrives at the receiving terminal at a very high speed which is injurious to the carrier. One means that has been used to slow the speed of the carrier is to time the blower so that it cuts off prior to carrier arrival; however, this requires precise timing since if the blower does not operate sufficiently long, the carrier will get stuck in the tubing. Another method is to exhaust the air in front of the carrier through the blower assembly in the receiving terminal, however, this is quite noisy and does not satisfactorily slow the carrier. This also creates a continuous back pressure that makes the overall operation of this system slower as well as it overworks the blower in the dispatching terminal.

DISCLOSURE OF THE INVENTION

In accordance with the present invention, a single line, pressure-pressure pneumatic tube system is provided with a pair of inline valves which are positioned in the horizontal run of tubing. Each valve is the same, however they are positioned in opposite directions so they will automatically operate in the correct manner depending upon direction of travel of the carrier. Each valve has a pivoted valve member. When there is no pressure in the system, the valve member hangs in the air stream, due to gravity, and the valve is full open. When the dispatching terminal is pressurized, air in front of the carrier causes the valve member, near the dispatching terminal to move toward a closed position. Within one carrier length after passage of the carrier, through the valve near the dispatching terminal, the valve will move to the full closed position, thereby maintaining pressure in the tubing, the transmission line, and providing for movement of the carrier. Meanwhile the valve, near the receiving terminal, is open and, accordingly, air in the tubing will be discharged and the speed of the carrier will not be impeded by dead air or back pressure as a result of pushing air thru a dead blower. As the carrier moves through the valve, near the receiving terminal, the valve will fully open and air in back of the carrier will be discharged lowering the pressure, whereby the pressure on back of the carrier will decrease, and the carrier will slow down. Moreover, the carrier will compress the air in the tubing in front of the carrier and further slow down the speed of the carrier. Carrier arrival at the receiving terminal will be soft as a result of the decrease in pressure plus the arresting action of the compressed column of air between the valve and the receiving terminal. A small bleed off orifice in the terminal relieves the air in front of the carrier so that the carrier will not be stopped in the tubing.

BRIEF DESCRIPTION OF DRAWINGS

The details of the invention will be described in connection with the accompanying drawing, in which.

BEST MODE FOR CARRYING OUT THE INVENTION

Figure 1:
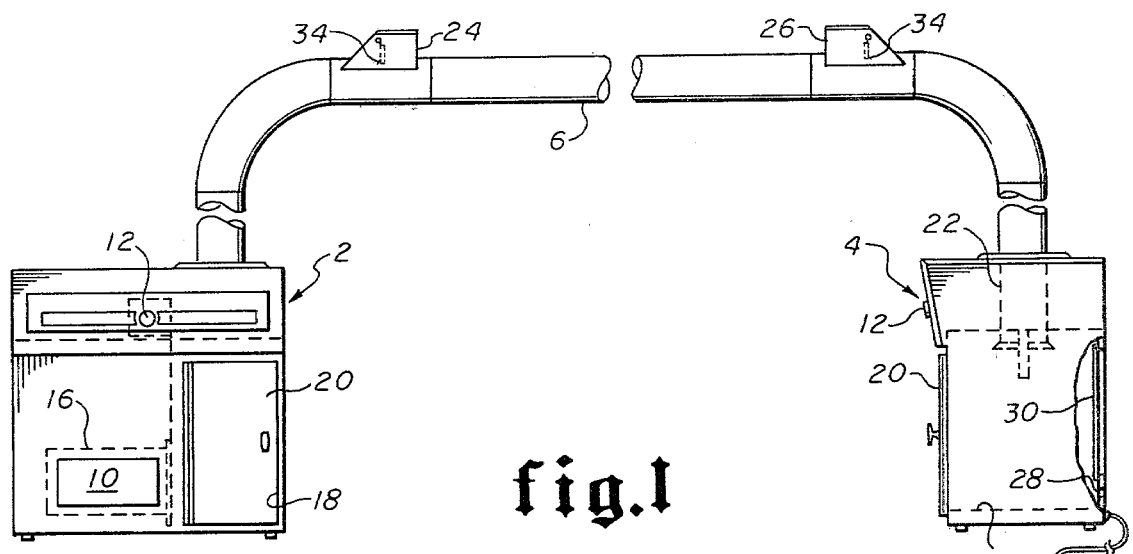
FIG. 1 is a diagrammatic view of the system of the present invention, illustrating the position of the valves with no pressure.
Figure 2:
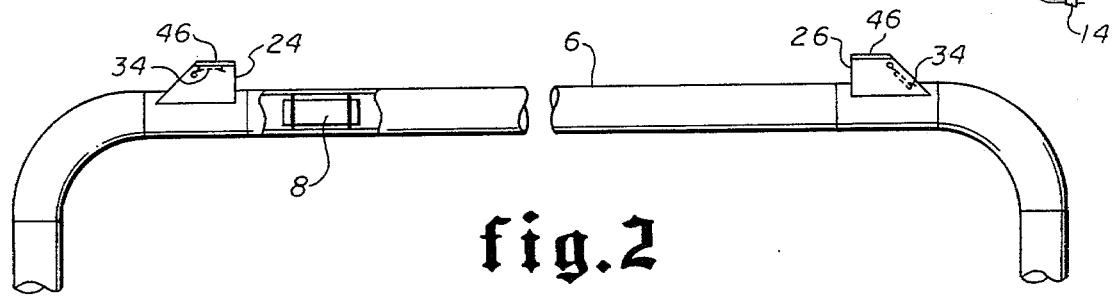
FIG. 2 is a diagrammatic view of the tubing in FIG. 1 after the carrier has passed the valve nearest the dispatching terminal.
Figure 3:
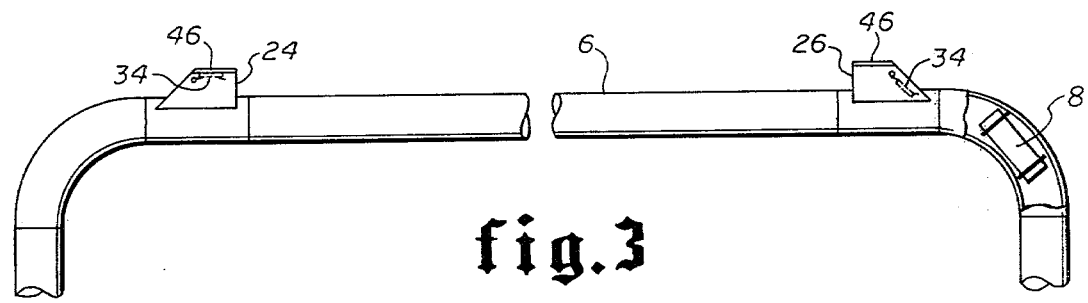
FIG. 3 is a view similar to FIG. 2 after the carrier has passed the valve nearest the receiving terminal.

Referring to the drawings, a single line, pressure-pressure pneumatic tube system constructed in accordance with the present invention is comprised of terminals 2 and 4, either one of which may act as a dispatching terminal or a receiving terminal. Terminal 2 is shown in front plan and terminal 4 is shown in side elevation. The two terminals are connected by tubing 6 which in normal installation will have two vertical runs and a horizontal run. A carrier 8 is transmitted from one terminal to the other terminal through the tubing 6. To provide air pressure to drive the carrier, each terminal is provided with a small electric blower 10 controlled by an electronic timing circuit energized by push button 12. The blower may be connected to any normal 110 V AC electrical circuit through a conventional plug 14 attached to an electrical cord. To provide quiet operation, the blower may be encased in a housing 16, formed of sound deadening material, which may be a length of PVC tubing. The electronic timing circuit will determine the interval motor 10 will run when the button 12 is energized. The time will naturally depend upon the distance between the two terminals.

Each terminal has a chamber 18, into which the carrier may be placed through a door 20 which in closed position fully seals the chamber. The chamber is in communication with the blower 10 and also with tubing 6 through a guide assembly 22 by which the terminal is attached to the tubing. The guide assembly 22 has a pivoted hanger which may be moved into position shown for carrier dispatch. The weight of the carrier will maintain it in such position. However, at other times, it will automatically move out of the line of carrier travel. Therefore, if a carrier is placed in chamber 18 and the blower energized by pushing button 12, air from the blower will flow into chamber 18 striking the carrier and forcing it through guide assembly 22 and into tubing 6. One problem with a pressure-pressure system is that the carrier will be under pressure throughout its entire trip, and; accordingly will arrive at the receiving terminal with a high velocity.

To control the speed of the carrier, the present system is provided with inline valves 24-26, which are identical, but placed in the horizontal run of tubing in facing relation. Each valve is so designed that it automatically opens or closes depending on the flow of air through the valve. The low pressure air preceding the carrier will set the mode of the valve and the higher pressure air trailing the carrier will complete the operation. When a carrier is put into motion, the valve nearest the dispatching terminal will start to close ahead of the carrier. As the carrier passes through the valve, the higher pressure behind the carrier will cause the valve to complete its seal. On the other hand the valve nearest the receiving terminal facing in the opposite direction will start to open under the low pressure ahead of the carrier and evacuate what would be compressed air in front of the carrier. After the carrier passes through the valve, the valve will move to a full open position and exhaust all the air behind the carrier into the atmosphere. Since the valves are placed in the horizontal run of tubing, which is normally above the ceiling, any noise from the exhausting of air will be minimized. The carrier then enters a dead air column and starts to decelerate, compressing the air ahead of it until the carrier makes a soft landing in the receiving terminal. Since the braking action of the dead air column could bring the carrier to a stop before it arrives at the receiving terminal, each chamber 18 is provided with at least one small bleed off port hole 28. To provide air for operation of the system, each terminal is provided with an intake valve 30 formed of a free hanging sheet of rubber reinforced with metal which may swing into chamber 18. Accordingly, when the blower in the dispatching terminal is started, valve 30 in the dispatching terminal opens to provide air. At the same time air arriving at the receiving terminal forces intake valve 30 in the receiving terminal closed. To further cushion the arrival of the carrier, the bottom of each chamber may be provided with a pad of 32 of shock absorbing material.

In order to accomplish the above defined operation automatically, valves 24-26 have pivoted valve members 34, each carrying a seal 36. The pivoted valve member may be formed of an arcuate strip of metal and due to gravity, hangs in the path of the air stream. Low pressure air in front of the carrier will bias the valve member toward either open or close depending on which face of the pivoted valve member the air strikes.

Figure 4:
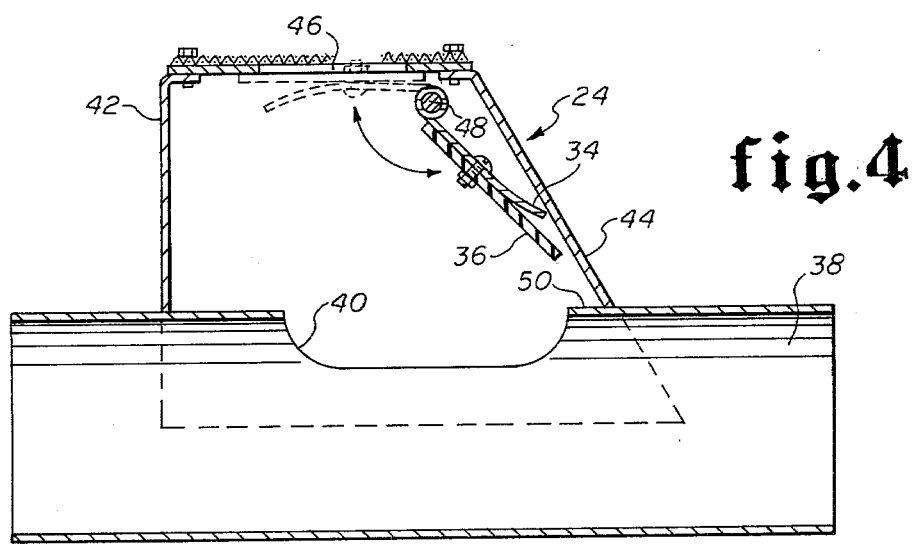
FIG. 4 is a cross section of the valve utilized to automatically regulate the speed of the carrier.

FIG. 4 being a cross section of the valve discloses such construction as well as the construction of the valve as a whole. As can be seen the valve has a main body 38 which may be formed from a length of tubing which is the same diameter as the tubing and is connected into the horizontal run of tubing 6. The body 38 has a longitudinal opening 40 and mounted thereon is a housing 42 which may have slanting end walls 44. The top of the housing 42 is provided with an exhaust port 46. The exhaust port is so designed that the seal 34 will seal around it in closed position. Mounted in the housing 42 adjacent the slanting end walls 44 is rod 48 which acts as a pivot for pivoted valve member 34. As can be seen in FIG. 1, gravity causes the pivoted valve member 34 and seal 36 to extend slightly into the path of air flow in the tubing. Any air movement in the tubing will cause the valve member 34 to swing to either a partially closed or a partially open position depending on the direction of flow. The higher pressure following the carrier will cause the valve to fully close or open. In the closed position, the seal 36 will engage the exhaust port 46 and close the air flow. In the open position, the valve member 34 will be away from the port 46 allowing air to be discharged. The valve will remain in such position until the air pressure drops to below that amount required to override the force of gravity. At such time, the valve member will drop to a vertical free standing position and be in position to automatically react to the next movement of air regardless of which direction it may come from. As can be seen in FIG. 4, the slanting end wall of housing 42 extends past longitudinal opening 40 so that there is a ledge 50, the ledge 50 in conjunction with the pivoted valve member and seal cooperate to prevent back pressure from improperly closing the valve by prohibiting air from getting in back of the valve member and seal.

Accordingly, assuming that terminal 2 is the dispatching terminal and terminal 4 is the receiving terminal, the carrier 8 is placed in the hanger of guide assembly 22 of terminal 2 and by pushing button 12, air flow in chamber 18 will strike the carrier 8 and start its movement through tubing 6. The air in front of the carrier will strike the swinging valve member of valves 24-26 and will cause the valve members to start moving toward their predetermined positions. In the valve 24 nearest terminal 2, the valve member will move toward closed and in the valve 26 nearest terminal 4, the valve member will move toward open. As carried moves through valve 24, the high pressure air in back of the carrier will move the valve member to a fully closed position within one carrier length. i.e., the seal 36 will engage with the wall surrounding the exhaust port to effect a seal. The valve member will remain in such position until the pressure in the tubing drops below the pressure counteracting gravity forces acting on the valve member. Meanwhile valve 26 near receiving terminal 4 facing in the opposite direction will have its valve member move toward the open position. As previously mentioned, the ledge 50 will prevent back pressure from moving the valve toward a closed position. Valve 26 will exhaust air in front of the carrier and accordingly dead air will not impede transmission of the carrier. As the carrier passes valve 26, the high pressure air in back of the carrier will cause the valve member to remain open and air in back of the carrier will be discharged into the atmosphere through exhaust port 46. As mentioned, the valve will usually be above the ceiling and noise from exhausting air is minimized. Since the air in back is discharged, the pressure on the carrier is decreased. Also there is a dead air column between the front of the carrier and receiving terminal 4. The carrier will tend to compress the air and further slow the carrier. To assure that the carrier reaches receiving terminal 4, orifice 28 slowly discharges air. Therefore, the carrier makes a soft landing.

As can be seen for the foregoing, the pressure-pressure system of the present invention is provided with a pair of inline valves in facing relation which automatically control the speed of the carrier so that it is automatically slowed as it approaches the receiving terminal and shock to the carrier is greatly reduced.

What is claimed is:

1. A single line pneumatic tube system comprising; a first end terminal having a power unit therein; a second end terminal having a power unit therein; a single line of tubing connecting the first terminal to the second terminal; two inline valves in the tubing line, one adjacent each terminal; a carrier for travel in the tubing from one terminal to the other terminal upon pressurization of a terminal; the valve adjacent the pressurized terminal closing after passage of the carrier, while the valve adjacent the other terminal opens after the passage of the carrier whereby the pressure propelling the carrier is reduced slowing the travel of the carrier to the other terminal, wherein each inline valve is comprised of a valve body formed of a length of tubing, a longitudinal opening in the tubing, a housing positioned over the opening, an exhaust port in the top of the housing, a pivot member in the housing, a valve member pivoted on the pivot member, a seal member of the valve member, the valve member moving to an open position as air flows in one direction and to a closed position where the seal member is in engagement with the exhaust port with air flow in the opposite direction.

2. The pneumatic tube system specified in claim 1 wherein each inline valve therein is further provided with a ledge which cooperates with the valve member to prevent improper closure.

3. The pneumatic tube system specified in claim 2 wherein the valve member is formed of an arcuate strip of material.

4. A single line pneumatic tube system comprising; a first end terminal having a power unit therein; a second end terminal having a power unit therein; a single line of tubing connecting the first terminal to the second terminal; two inline valves in the tubing line, one adjacent each terminal; a carrier for travel in the tubing from one terminal to the other terminal upon pressurization of a terminal; the valve adjacent the pressurized terminal closing after passage of the carrier, while the valve adjacent the other terminal is at least partially open when the carrier is upstream thereof for directly exhausting air from tubing in front of the carrier to the environment and remains open after the passage of the carrier whereby the pressure propelling the carrier is reduced slowing the travel of the carrier to the other terminal, each of said valves comprising a valve body formed of a length of tubing having the same diameter as the tubing of the system, a longitudinal opening in the tubing, a housing positioned over the opening, an exhaust port in the top of the housing, a pivot member in the housing, a valve member pivoted on the pivot member and extending by gravity into the opening in the valve body, a seal member on the valve member, the valve member moving to an open position as air flows in one direction and to a closed position where the seal member is engagement with the exhaust port with air flow in the opposite direction.

* * * * *